(12) United States Patent
Belanger et al.

(10) Patent No.: US 9,190,883 B2
(45) Date of Patent: Nov. 17, 2015

(54) CURRENT SWITCHING PULSE SERVO

(75) Inventors: Brian E. Belanger, Farmington Hills, MI (US); Robert W. Wunsche, III, Clarkston, MI (US)

(73) Assignee: DENSO International America, Inc., Southfield, MI (US)

( * ) Notice: Subject to any disclaimer, the term of this patent is extended or adjusted under 35 U.S.C. 154(b) by 152 days.

(21) Appl. No.: 13/299,713

(22) Filed: Nov. 18, 2011

(65) Prior Publication Data

US 2013/0127304 A1    May 23, 2013

(51) Int. Cl.
| | |
|---|---|
| *G05B 11/32* | (2006.01) |
| *G05B 11/01* | (2006.01) |
| *H02K 7/116* | (2006.01) |
| *H02K 11/00* | (2006.01) |
| *B60H 1/00* | (2006.01) |

(52) U.S. Cl.
CPC .......... *H02K 7/1166* (2013.01); *H02K 11/0015* (2013.01); *B60H 1/00835* (2013.01)

(58) Field of Classification Search
CPC .. H02K 11/0015; H02K 7/1166; H02K 11/00

USPC .................................. 318/625, 560, 266, 466
See application file for complete search history.

(56) References Cited

U.S. PATENT DOCUMENTS

| | | | |
|---|---|---|---|
| 6,252,367 B1 * | 6/2001 | Sakamoto et al. ............. | 318/560 |
| 7,129,668 B2 * | 10/2006 | Kuribayashi et al. ......... | 318/625 |
| 2004/0124797 A1 * | 7/2004 | Takeuchi et al. .............. | 318/466 |
| 2005/0134210 A1 * | 6/2005 | Nakajima ...................... | 318/652 |

FOREIGN PATENT DOCUMENTS

JP          2006262641         9/2006

* cited by examiner

*Primary Examiner* — Paul Ip
*Assistant Examiner* — Devon Joseph
(74) *Attorney, Agent, or Firm* — Harness, Dickey & Pierce, P.L.C.

(57) ABSTRACT

A current switching pulse servo including a motor, an output gear, a pulse pattern plate, and a first conductor. The motor is configured to drive a gear train of the servo. The output gear is configured to be driven by the gear train. The pulse pattern plate includes conductive portions and nonconductive portions. The pulse pattern plate is configured to rotate with the output gear. The first conductor connects the motor to the pulse pattern plate to conduct current from the motor to the pulse pattern plate.

38 Claims, 7 Drawing Sheets

| | First Home Position 162 | | | | | | Normal Operation | | | | | | Second Home Position 164 | | | | |
|---|---|---|---|---|---|---|---|---|---|---|---|---|---|---|---|---|---|
| Pattern No. | 1 | 2 | 1 | 2 | 3 | 1 | 1 | 2 | 3 | 1 | 2 | 3 | 1 | 2 | 3 | 2 | 3 |
| A - Phase Input | 1 | 1 | 1 | 1 | 0 | 1 | 1 | 1 | 0 | 1 | 1 | 0 | 1 | 1 | 0 | 1 | 0 |
| B - Phase Input | 0 | 1 | 0 | 1 | 1 | 0 | 0 | 1 | 1 | 0 | 1 | 1 | 0 | 1 | 1 | 1 | 1 |

CURRENT SWITCHING PULSE SERVO

FIELD

The present disclosure relates to a current switching pulse servo.

BACKGROUND

This section provides background information related to the present disclosure which is not necessarily prior art.

Heating, ventilation, and air conditioning systems often employ one or more servos to control vent door positions. Each servo includes a motor that drives a gear train, which in turn moves a door to a desired position. A controller connected to the servo determines and controls the position of the door based on feedback from the servo. The feedback can be in the form of a pulse pattern generated at a pulse pattern plate mounted on an output gear of the servo.

Current for the battery and the servo motor is supplied by two different sources. For example, the motor receives current from a motor driving circuit of the controller and the pulse pattern plate receives current from a battery that is external to the servo. This arrangement requires two wire lines and harnesses between the motor and the driving circuit to conduct current to and from the motor, and at least one wire line or harness to connect the battery to the pulse pattern plate. The plurality of wire lines and harnesses contributes to manufacturing complexity and production costs.

SUMMARY

This section provides a general summary of the disclosure, and is not a comprehensive disclosure of its full scope or all of its features.

The present teachings provide for a current switching pulse servo including a motor, an output gear, a pulse pattern plate, and a first conductor. The motor is configured to drive a gear train of the servo. The output gear is configured to be driven by the gear train. The pulse pattern plate includes conductive portions and nonconductive portions. The pulse pattern plate is configured to rotate with the output gear. The first conductor connects the motor to the pulse pattern plate to conduct current from the motor to the pulse pattern plate.

The present teaching further provide for a current switching pulse servo including a DC motor, an output gear, a pulse pattern plate, a first conductor, a second conductor, and a third conductor. The DC motor is configured to drive a gear train of the servo. The output gear is configured to be driven by the gear train. The pulse pattern plate includes a first pulse pattern, a second pulse pattern, and a common conductive portion. The pulse pattern plate is configured to rotate with the output gear. A first conductor connects the DC motor to the common conductive portion. A second conductor is configured to conduct first pulses from the first pulse pattern to a pulse signal detection circuit. The third conductor is configured to conduct second pulses from the second pulse pattern to the pulse signal detection circuit.

The present teachings also provide for a current switching pulse servo including a DC motor, an output gear, a pulse pattern plate, and first, second, and third conductive contact points. The DC motor is configured to receive current from a motor driving circuit of a control circuit, and drive a gear train of the servo. The output gear is configured to be driven by the gear train. The pulse pattern plate is mounted to the output gear and includes an outer pulse pattern, a common conductive portion, and an inner pulse pattern between the outer pulse pattern and the common conductive portion. The outer pulse pattern includes a plurality of spaced apart outer conductive portions with outer nonconductive portions therebetween. The inner pulse pattern includes a plurality of spaced apart inner conductive portions with inner nonconductive portions therebetween. The first conductive contact point is mounted at the outer pulse pattern and is configured to conduct A-phase pulses when the first conductive contact point is in electrical contact with the outer conductive portions. A first conductor line is configured to conduct the A-phase pulses to a signal detecting circuit of the control circuit. The second conductive contact point is mounted at the inner pulse pattern and is configured to conduct B-phase pulses when the second conductive contact point is in electrical contact with the inner conductive portions. A second conductor line is configured to conduct the B-phase pulses to the pulse signal detecting circuit. A third conductive contact point is in continuous contact with the common conductive portion. A third conductor line conducts current from the DC motor to the third conductive contact point.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
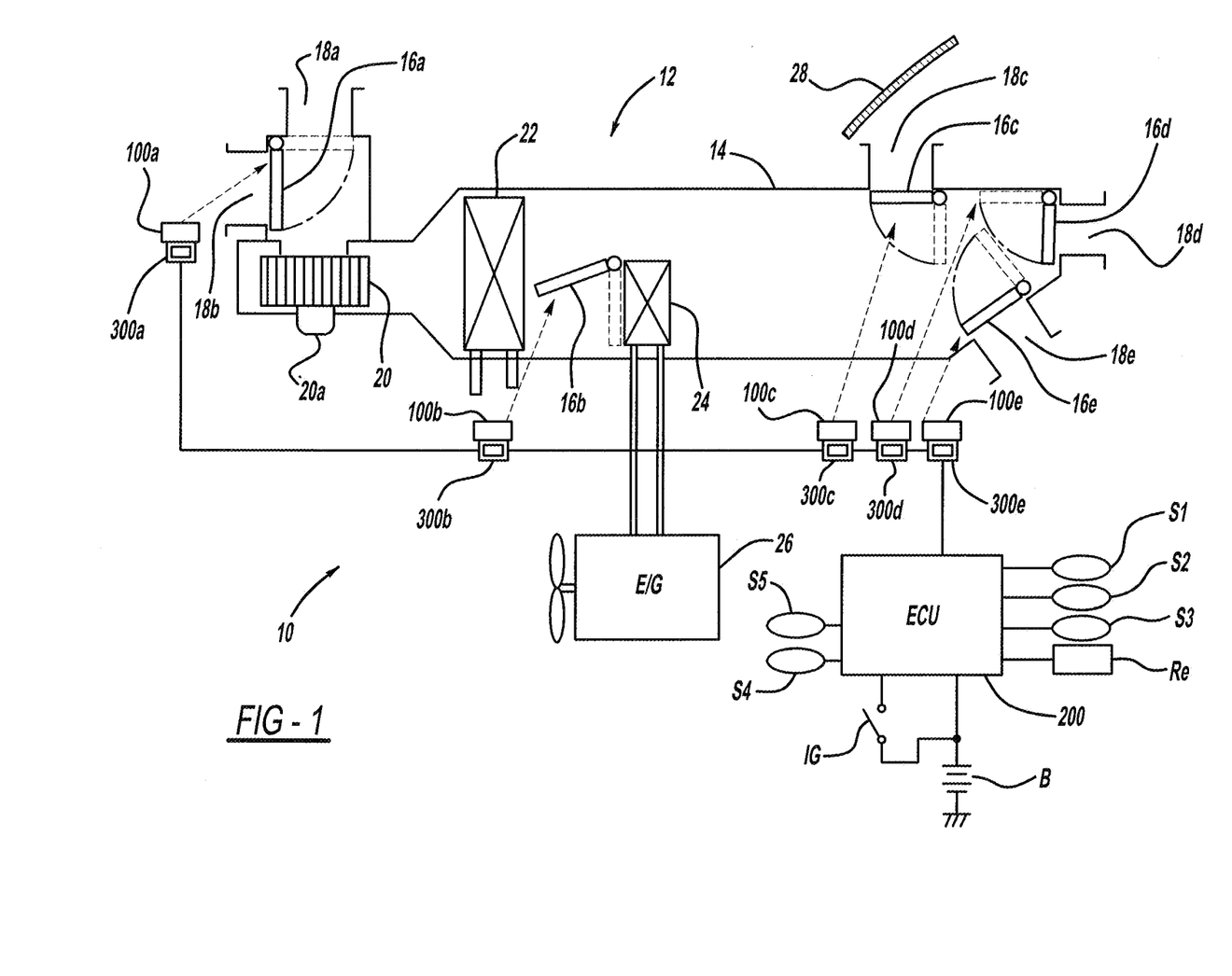
FIG. 1 is a schematic diagram of a vehicle air conditioning system according to the present teachings.

With initial reference to FIG. 1, a vehicle HVAC or air conditioning system according to the present teachings is generally illustrated at reference numeral 10. The air conditioning system 10 includes an air conditioning unit 12, which has a case 14 and is seated within a dashboard panel.

The air conditioning case 14 includes an indoor/outdoor air switching door 16a, which is rotatably mounted in the case 14. The door 16a is switched to a first position (indicated by a solid line in FIG. 1) under the driving of a servomechanism or servo 100a to introduce outdoor air from an outdoor air introducing port 18a into the air conditioning case 14. The indoor/outdoor air switching door 16a is switched to a second portion (indicated by a broken line in FIG. 1) under the driving of the servo 100a to introduce air inside the vehicle (indoor air) into the air conditioning case 14 through an indoor air introducing port 18b.

A blower 20 blows the outdoor air from the outdoor air introducing port 18a or the indoor air from the indoor air introducing port 18b as an air stream to an evaporator 22 in accordance with the rotational speed of a blower motor 20a. The evaporator 22 cools the air stream blown out from the blower 20 with refrigerant, which is circulated by actuation of a well-known refrigerating cycle.

An air mix door 16b is driven by a servomechanism or servo 100b to distribute the cooled air stream from the evaporator 22 into a first cooled air stream and a second cooled air stream. The first cooled air stream flows into a heater core 24 and the second cooled air stream bypasses the heater core 24. The first cooled air stream is heated in the heater core 24 by cooling water (hot water) from the engine 26, and thus hot air is blown out from the heater core 24. The hot air from the heater core 24 and the second cooled air stream, which bypassed the heater core 24, are mixed and flow to blow-out port doors 16c, 16d, and 16e. The mixture ratio SW (%) of the hot air and cooled air is determined by an opening degree of the air mix door 16b.

Under driving of a servomechanism or servo 100c, defrosting blow-out port door 16c is switched from a first position (indicated by a solid line of FIG. 1) to a second position (indicated by the broken line of FIG. 1) in a defrosting mode. In the second position, opening portion 18c is unrestricted or open to permit air from within the case 14 to pass through the opening portion 18c to an inner surface of front windshield 28.

Under driving of a servomechanism or servo 100d, a face blow-out port door 16d is switched from a first position (indicated by a solid line of FIG. 1) to a second position (indicated by a broken line of FIG. 1) in a face mode. In the second position, opening portion 18d is unrestricted or open to permit air from within the case 14 to pass through the opening portion 18d to the upper bodies of occupants.

Under driving of a servomechanism or servo 100e, a foot blow-out port door 16e is switched from a first position (indicated by a solid line of FIG. 1) to a second position (indicated by a broken line of FIG. 1) in a foot mode. In the second position, opening portion 18e is unrestricted or open to permit air from within the case 14 to pass through the opening portion 18e to the lower bodies or feet of occupants. In a bi-level mode, the blow-out port doors 16d and 16e are each switched to the second position to unrestrict or open both opening portions 18d and 18e.

The doors 16a to 16e are formed of resin or the like in the shape of a plate, and can be of any other suitable shape, size, or material as well. The doors 16a to 16e are each pivotally mounted to a different servo output shaft to permit individual rotation thereof, as further described herein.

Figure 2:
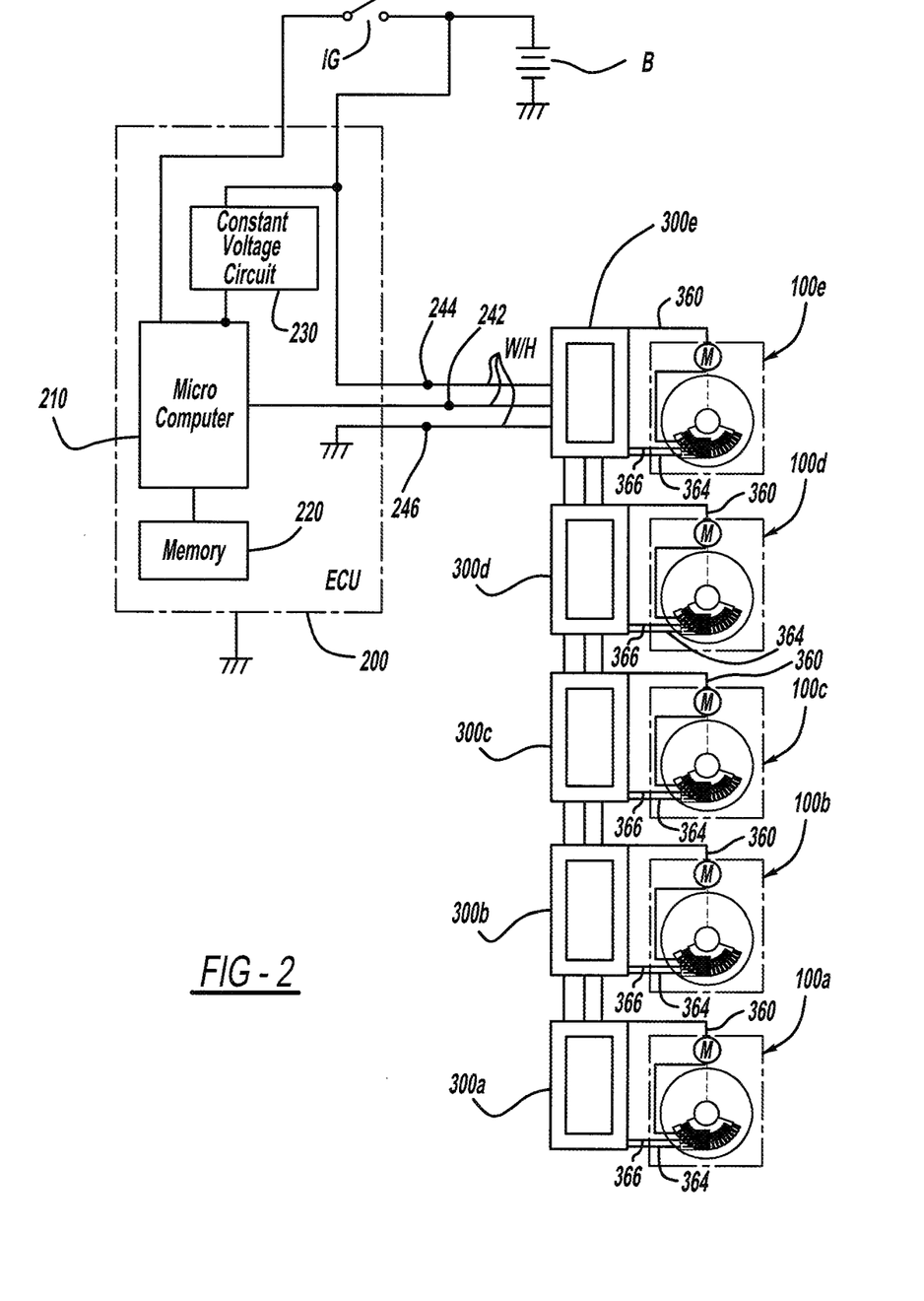
FIG. 2 is a diagram illustrating electrical connections between an electrical control unit, control circuits, and servos of the air conditioning system of FIG. 1.

With continued reference to FIG. 1 and additional reference to FIG. 2, the vehicle air conditioning system 10 further includes an electrical control unit (ECU) 200, which controls the servos 100a to 100e through control circuits 300a to 300e, as further described herein. The ECU 200 includes a microcomputer 210, a memory or storage unit 220, and a constant voltage circuit 230.

The microcomputer 210 controls the blower motor 20a in accordance with in-vehicle temperature detected by an indoor air temperature sensor S1, in-vehicle light radiation intensity detected by a radiation sensor S2, exterior vehicle temperature detected by an outdoor temperature sensor S3, and/or a set temperature output from a temperature setter Re, which is set by an occupant of the vehicle. The memory 220 of the ECU 200 includes a ROM for storing computer programs, for example, and RAM for storing data generated through the processing of the microcomputer 210, for example. The constant voltage circuit 230 converts a voltage output from an in-vehicle battery B to a constant voltage and outputs it to the microcomputer 210, for example.

Each one of the control circuits 300a to 300e is connected to a different one of the servos 100a to 100e respectively to control the associated servos 100a to 100e, as described herein. The electrical control unit 200 is connected to the control circuit 300e through a communication line 242, a power supply line 244, and a ground line 246, each of which are also used to connect the different servos 100a to 100e together as illustrated.

Figure 3:
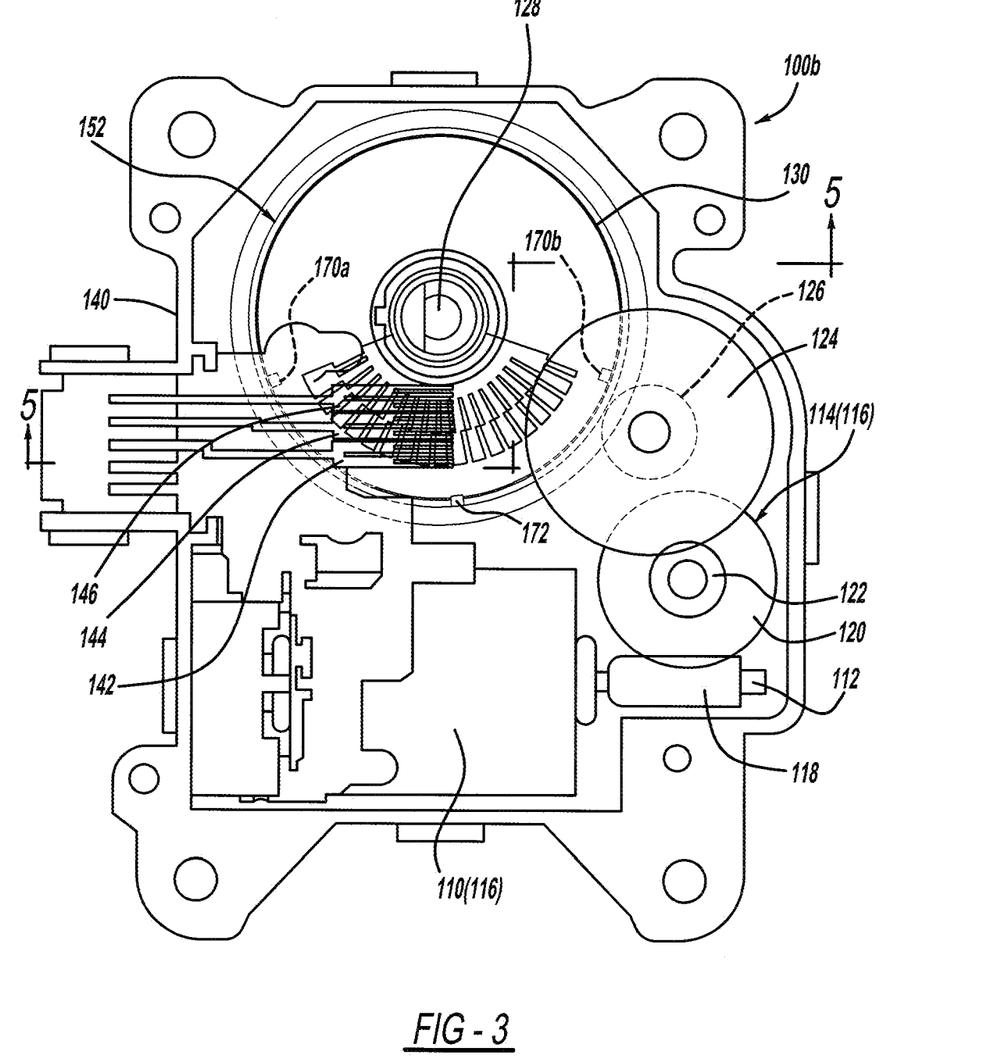
FIG. 3 is a schematic diagram of one of the servos of FIG. 1.

The servo 100b is similar to the servos 100a and 100c to 100d, and thus the following further description of the servo 100b also applies to the servos 100a and 100c to 100d. As illustrated in FIG. 3, for example, the servo 100b includes a motor 110, such as a DC motor, which is ultimately supplied with power from in-vehicle battery B (FIGS. 1 and 2) to rotate an output shaft 112. A deceleration mechanism 114 is included as a transmission mechanism for decelerating rotational force from the motor 110 and outputting the rotational force thus decelerated ultimately to the air mix door (A/M door) 16b. The rotationally driving mechanism portions such as the motor 110 and the deceleration mechanism 114 are collectively referred to herein as "driving portions 116."

Figures 4, 5, 6, 7B:
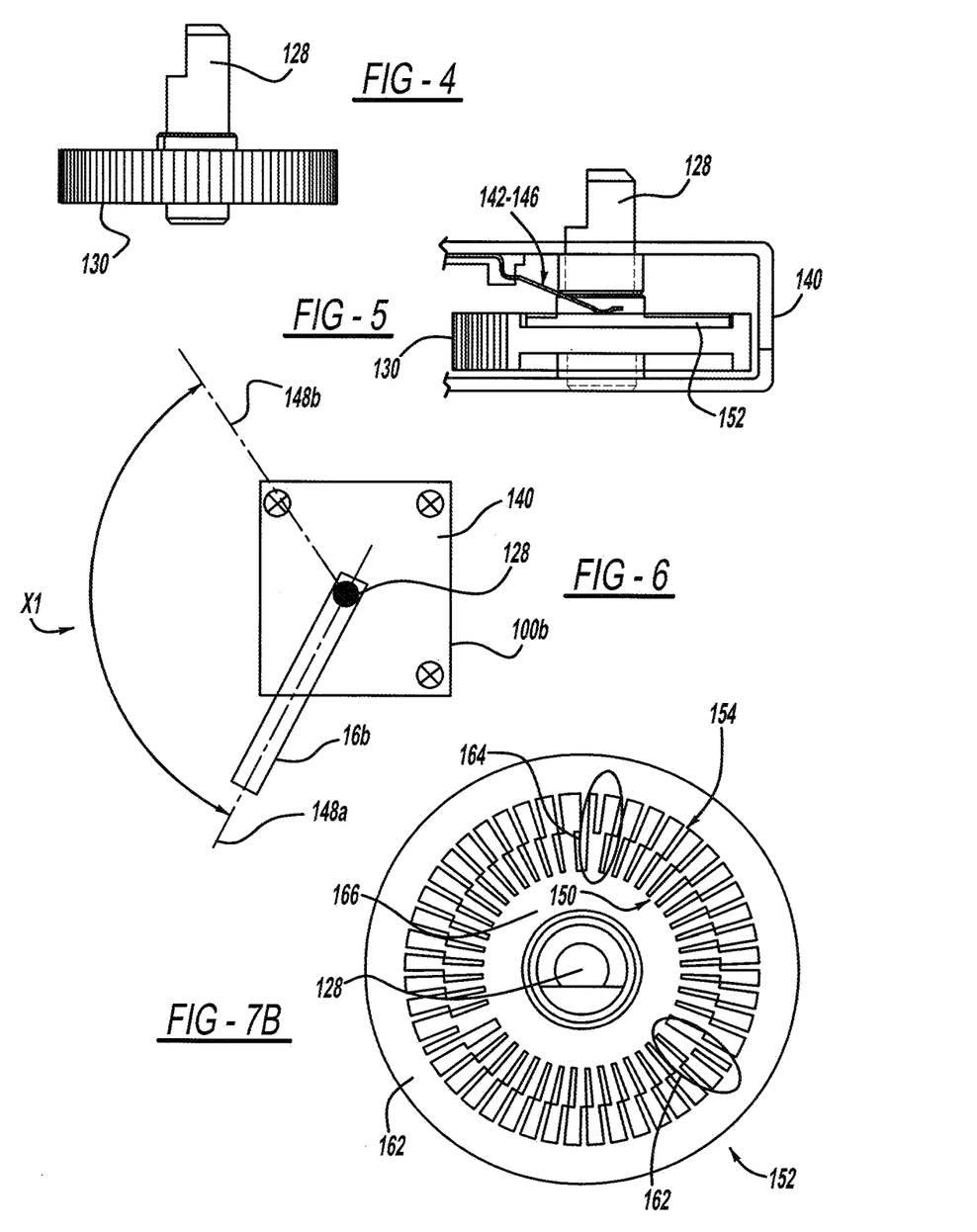
FIG. 4 is a side view of a pulse plate of the servos of FIG. 3.
FIG. 5 is cross-sectional view taken along line 5-5 of FIG. 3.
FIG. 6 is an exterior view of one of the servos of FIG. 3 and a control range of a door mounted to an output shaft of the servo.
FIG. 7B is a front view of another pulse plate according to the present teachings.

The deceleration mechanism 114 is a gear sequence including a worm 118 press-fit on the output shaft 112 of the motor 110, a worm wheel 120 engaged with the worm 118, plural spur gears 122, 124, and 126, and an output shaft 128, which is connected to an output or final-stage gear 130 (FIGS. 3 and 4, for example). The final-stage gear 130 includes a pulse pattern plate 152.

With continued reference to FIG. 3 and additional reference to FIG. 5, the servo 100b further includes an outer casing 140, which houses the driving portions 116. Affixed to the casing 140 are first, second, and third electrical contact points or brushes 142, 144, and 146. The brushes 142, 144, and 146 are arranged opposite to the pulse pattern plate 152. Further description of the brushes 142, 144, and 146 is provided herein.

With reference to FIG. 6, the output shaft 128 extends out from within the casing 140 and is coupled to the air mix door 16b. The output shaft 128 is coupled to the air mix door 16b in any suitable manner such that rotation of the output shaft 128 rotates the air mix door 16b across a control range X1 between a first position 148a and a second position 148b. Any suitable control range can be provided, such as about 120° as illustrated.

Figure 7A:
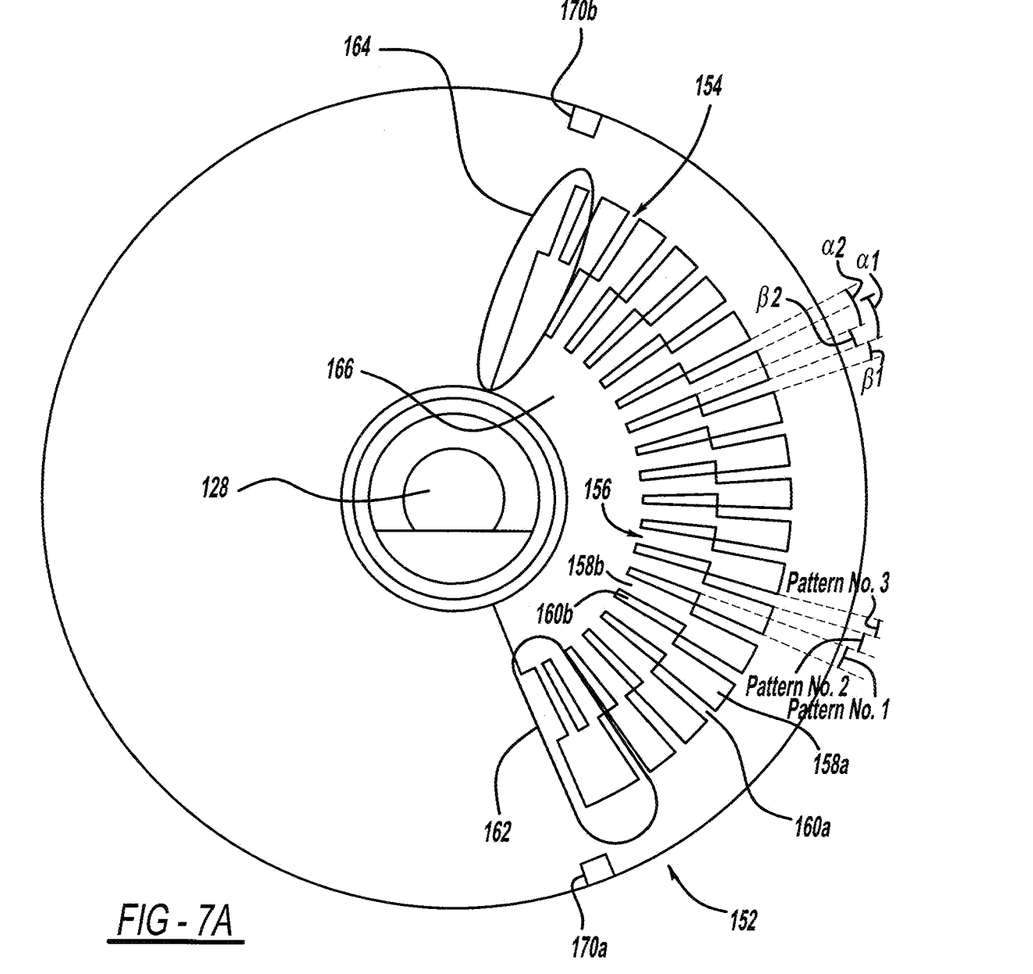
FIG. 7A is a front view of the pulse plate of the servo of FIG. 3.

With additional reference to FIG. 7A, the pattern plate 152 includes a first or outer pulse pattern 154 and a second or inner pulse pattern 156. The outer pulse pattern 154 includes outer conductive portions 158a and the inner pulse pattern 156 includes inner conductive portions 158b. Also, the outer pulse pattern 154 includes outer nonconductive portions 160a and the inner pulse pattern 156 includes inner nonconductive portions 160b. The conductive portions 158a, 158b and the nonconductive portions 160a, 160b are alternately arranged circumferentially about the pattern plate 152.

The distance that the inner and outer pulse patterns 154 and 156 extend about the pattern plate 152 can vary depending on the desired degree of rotation of the pattern plate 152, which corresponds to the desired degree of rotation of the door 16b. For example, if the door 16b is to be rotated across a control range X1 of 120°, then the inner and outer pulse patterns 154 and 156 need not extend more than 120° about the pattern plate 152, as illustrated in FIG. 7A. With reference to FIG. 7B, the inner and outer pulse patterns 154 and 156 can extend greater than 120° about the pattern plate 152, such as 360° for example.

With continued reference to FIG. 7A for example, the outer and inner conductive portions 158a and 158b each have a circumference angle of α1 and α2 respectively, which are substantially the same. The outer and inner nonconductive portions 160a and 160b each have a circumference angle of β1 and β2 respectively, which are substantially the same. The circumference angles α1 and α2 of the conductive portions 158a and 158b are each twice as large as either one of the circumference angles β1 and β2 of the nonconductive portions 160a and 160b. The phase of the outer pulse pattern 154 is displaced from the phase of the inner pulse pattern 156 by a distance about half that of angles α1, α2. The outer and inner conductive portions 158a and 158b with the nonconductive portions 160a and 160b respectively therebetween are generally arranged in a repeating pattern about the circumference of the pattern plate 152.

The pattern plate 152 is thus generally divided into a number of different pattern areas, as illustrated in FIG. 7A for example. A first pattern (no. 1) is defined by each of the inner nonconductive portions 160b and the area of the outer conductive portion 158a aligned therewith. A second pattern (no. 2) is defined by the aligned portions of each of the outer and inner conductive portions 158a and 158b respectively. A third pattern (no. 3) is defined by the each of the outer nonconductive portions 160a and the inner conductive portion 158b aligned therewith.

The pattern plate 152 can also include one or more "home" positions or areas where the repeating pattern of the conductive and nonconductive portions 158 and 160 is modified. For example, a first home position is illustrated at reference numeral 162. At the first home position 162, the pattern plate 152 is modified to eliminate the third pattern (no. 3), and thus one of the outer nonconductive portions 160a and a half of the inner conductive portion 158b aligned therewith are eliminated. A second home position is illustrated at reference numeral 164. At the second home position 164 the pattern plate 152 is modified to eliminate the first pattern (no. 1), and thus one of the outer conductive portions 158a and the inner nonconductive portion 160b aligned therewith are eliminated.

As illustrated in FIG. 7A, the first home position 162 and the second home position 164 are spaced approximately 120° apart about the pattern plate 152. In FIG. 7B, the first and the second home positions 162 and 164 are provided at approximately 120° intervals about an entirety of the pattern plate 152. Any other suitable number of home positions can be provided, such as one, two, three, four, etc., and any suitable variation in the repeating pattern of conductive and nonconductive portions 158 and 160 can be used. Use of home positions is not required, and is thus optional. As further described herein, the home positions 162 and 164 assist the ECU 200 with identifying the rotational position of both the pattern plate 152 and the associated output shaft 128, as well as the position of the door 16b in the control range X1.

The outer and inner pulse patterns 154 and 156 are electrically connected together, and are each electrically connected to a common conductive portion ("common portion") 166. The common portion 166 is between the inner pulse pattern 156 and an axial center of the pattern plate 152, at which the pattern plate 152 defines an opening to accommodate the output shaft 128.

Figure 8:
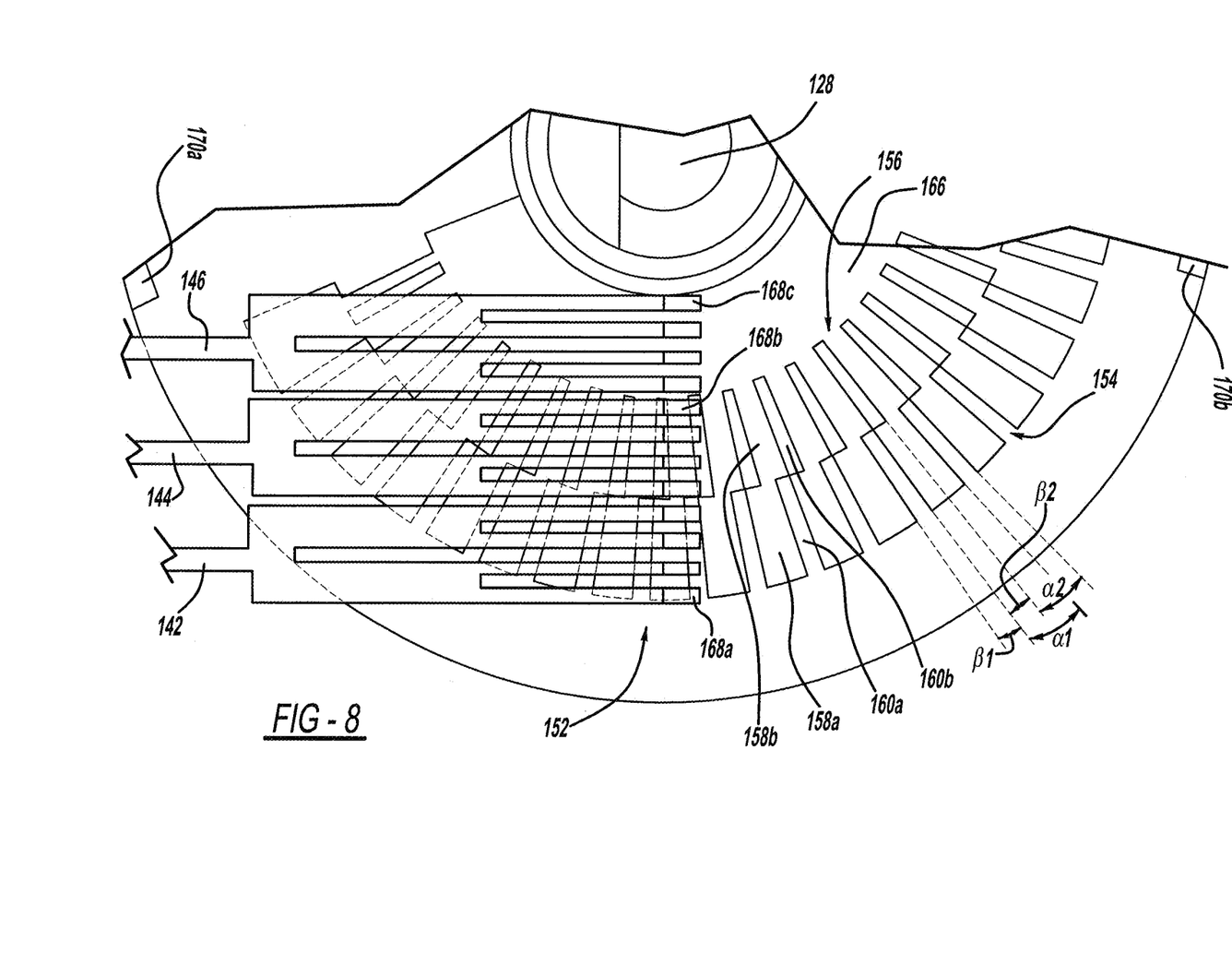
FIG. 8 is an enlarged view of the pulse plate of FIG. 7A.

With additional reference to FIG. 8, the first or A-phase brush 142 is aligned with the outer pulse pattern 154, the second or B-phase brush 144 is aligned with the inner pulse pattern 156, and the third brush 146 is aligned with the common portion 166. The brushes 142, 144, and 146 are formed of any suitable conductive material, such as copper, and are suitably affixed to the casing 140, such as by resin integral molding. Each of the brushes 142, 144, and 146 include a plurality of contact points 168a, 168b, and 168c respectively, such as four for example, to provide electrical connection between contact points 168a and the outer conductive portions 158a, between the contact points 168b and the inner conductive portions 158b, and between the contact points 168c and the common portion 166.

As illustrated in FIGS. 3, 7a, and 8 for example, the pattern plate 152 can further include plate flanges 170a and 170b, which protrude from the pattern plate 152. The casing 140 can include a case flange 172, which protrudes from the casing 140. The plate flanges 170a and 170b and the case flange 172 can be positioned at any suitable positions on the pattern plate 152 and the casing 140 respectively to restrict rotation of the pulse pattern plate 152, the output shaft 128, and ultimately the air mix door 16b. For example, by positioning the plate flanges 170a and 170b spaced apart at about 120° relative to each other at opposite ends of the outer and inner pulse patterns 154 and 156, and arranging the pulse pattern plate 152 such that the case flange 172 is between the plate flanges 170a and 170b, rotation of the pattern plate 152 will be restricted to 120°, which will ultimately also restrict rotation of the air mix door 16b to 120°.

Figure 9:
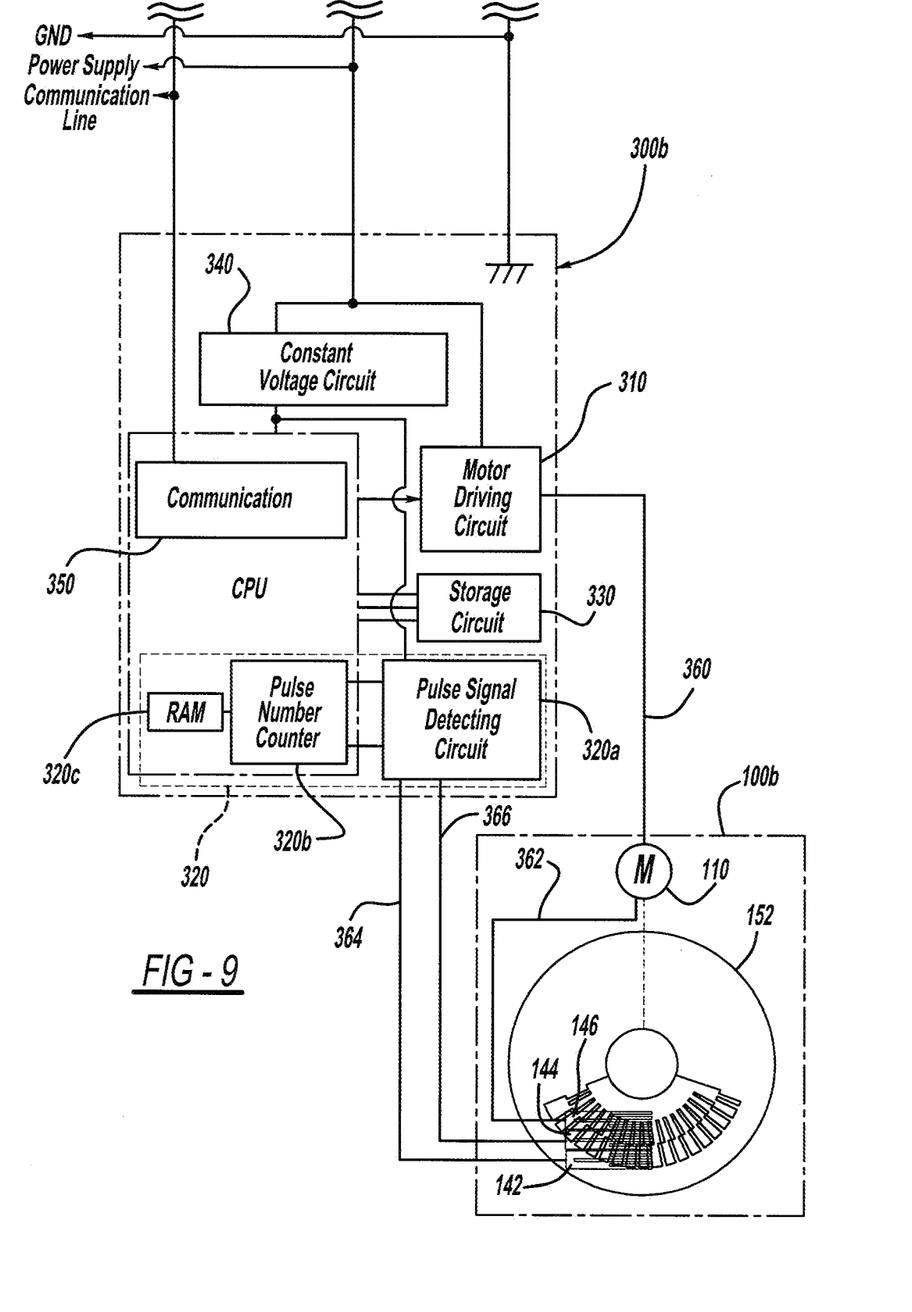
FIG. 9 is a diagram of one of the control circuits and one of the servos of FIGS. 1 and 2, and electrical connections therebetween.

FIG. 9 is a schematic diagram illustrating the control circuit 300b of the servo 100b. The control circuit 300b generally includes a motor driving circuit 310, a rotational angle detecting unit 320, a storage circuit 330, a constant voltage circuit 340, and a communication unit 350. The rotational angle detecting unit 320 includes a pulse detecting circuit 320a, a pulse number counter 320b, and RAM memory 320c.

The motor driving circuit 310 drives the motor 110. The rotational angle detecting unit 320 detects the rotational angle of the output shaft 128 and the direction of rotation of the pattern plate 152 on the basis of the pulse signals occurring at the pattern plate 152. The storage circuit 330 can hold input information with no power supply, and can include flash memory for storing various kinds of control information. The communication circuit 350 communicates with the electrical control unit 200 through a communication line.

Current from the motor driving circuit is conducted to the motor 110 via a first line or wire 360. From the motor 110, current is conducted to the pulse pattern plate 152 with a second line or wire 362, which extends from the motor 110 to the common brush 146. Because only the single first wire 360 extends between the motor driving circuit 310 and the motor 110, only a single wire harness is necessary. Current supplied from the motor 110 is not returned to the motor driving circuit 310, thus making it unnecessary for a return wire to extend between the motor 110 and the motor driving circuit 310, which eliminates the need for another wire harness. Since only the first wire 360 extends between the motor driving circuit 310 and the motor 110, manufacturing is simplified and production costs can be reduced. Further, current for the pattern plate 152 need not be provided by a separate battery, which can eliminate the need for another wire or harness extending to and from the servo 100b, as well as reduce manufacturing and materials costs.

Electrically connecting the first brush 142 to the pulse detecting circuit 320a is a third line or wire 364. A fourth line or wire 366 electrically connects the second brush 144 to the pulse detecting circuit 320a. Thus, the present teachings provide for as few as three lines or wires 360, 364, and 366 between the servo 100b and the control circuit 300b, thereby simplifying manufacturing, reducing costs, and conserving materials.

As the pattern plate 152 is rotated by the motor 110, contact between the first brush 142 and each the outer conductive portions 158a of the pattern plate 152 generates an A-phase input pulse, which is conducted to the pulse detecting circuit 320a through the wire 364. Contact between the second brush 144 and the inner conductive portions 158b of the pattern plate 152 generates a B-phase input pulse. Accordingly, pulse signals occur at the first brush 142, the second brush 144, or both the first and the second brushes 142 and 144 each time the motor 110 rotates the pattern plate 152 a predetermined angle, such as half the angle α or the angle β (FIGS. 7 and 8). The first and the second brushes 142 and 144 and the pattern plate 152 thus constitute a pulse generating unit for emitting pulse signals every time the output shaft 128 is rotated by a predetermined angle.

Because the outer pulse pattern 154 and the inner pulse pattern 156 are displaced from each other in phase, the A-phase pulse and the B-phase pulse are displaced in phase between the first and second home positions 162 and 164. The direction of rotation of the motor 110 is detected by the rotational angle detecting unit 320 based on which one of the A-phase pulse and the B-phase pulse is preferentially input to the rotational angle detecting unit 320.

Figure 10:
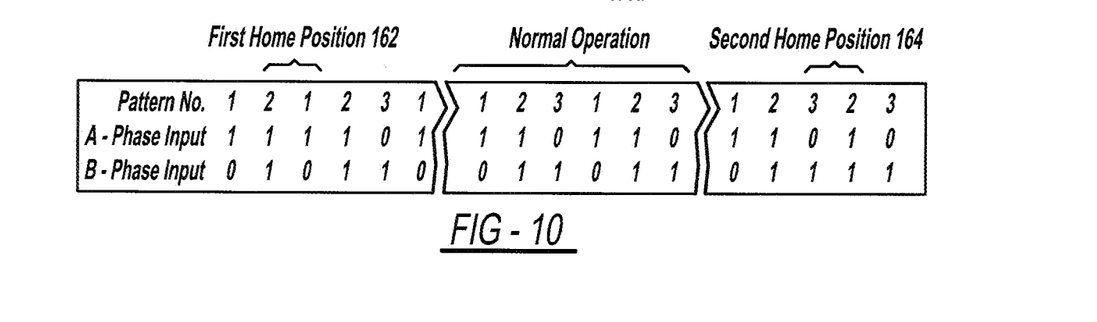
FIG. 10 is a chart of pulse patterns generated at the pulse pattern plate of FIG. 7A.

With additional reference to FIG. 10, when the motor 110 is rotated in a plus count direction between the first and the second home positions 162 and 164, the state of the A-phase pulse and the B-phase pulse is periodically switched in the following order: [1,0]→[1,1]→[0,1]→[1,0]→[1,1]→[0,1]→ . . . . On the other hand, when the motor 110 is rotated in a minus count direction, the state of the A-phase pulse and the B-phase pulse is reversed and thus periodically switched in the following order: [0,1]→[1,1]→[1,0]=[0,1]→[1,1]→[1,0]→ . . . . At the first home position 162, the third pattern (no. 3) is not included and thus the state of the A-phase pulse and the B-phase pulse is switched in the following order: [1,0]→[1,1]→[1,0]. At the second home position 164, the first pattern (no. 1) is not included and thus the state of the A-phase pulse and the B-phase pulse is switched in the following order: [0,1]→[1,1]→[0,1]. The pulse sequences set forth above are provided for exemplary purposes only as any suitable pulse sequence can be used. For example, a pulse sequence with an alternating pulse of [1,1] could be used, such as: [1,0]→[1,1]→[0,1]→[1,1]→[1,0]→[1,1]→[0,1]→ . . . .

The electrical control unit 200 controls the position of the air mix door 16b by generating and transmitting to the servo 100b a target stop command, which identifies a position within the control range X1 to which the air mix door 16b is to be moved to. Upon receiving the target stop command, the electrical control unit 200 starts the motor 110 to drive the output shaft 128. As the output shaft 128 and the pattern plate 152 are rotated, the control circuit 300b renews the present position of the output shaft 128 in accordance with the state of the A-phase and the B-phase pulses, stores the renewed present position into the storage circuit 330, and cuts power to the servo 100b when the target stop position and the present position are coincident with each other, thereby stopping the air mix door 16b at the desired position within the control range X1.

The control circuit 300b can be configured to recognize the first and the second home positions 162 and 164 as stop positions, thereby limiting rotation of the pattern plate 152 and ultimately the door 16b. For example, upon reading the [1,0]→[1,1]→[1,0] pulse pattern of the first home position 162 or the [0,1]→[1,1]→[0,1] pulse pattern of the second home position 164, the control circuit 300b will cut power to the motor 110 to prevent the door 16b from moving outside the control range X1. The first and the second home positions 162 and 164 can thus eliminate the need for physical stops, such as stopper pins at an exterior of the casing 140, as well as both the plate flanges 170 and the case flanges 172.

Because the first and second home positions 162 and 164 represent the opposite ends of the control range X1 in the above example, the control circuit 300b can use the home positions 162 and 164 to identify the position of the door 16b within the control range X1. For example, when pattern plate 152 is rotated such that the brushes 142-146 are at the first home position 162, the control circuit 300b determines that the door 16b is at a first end (first position 148a) of the control range X1. When the pattern plate 152 is rotated such that the brushes 142-146 are at the second home position 164, the control circuit 300b determines that the door 16b is at a second end (second position 148b) of the control range X1. As a result, there is no need for an initialization sequence at start-up in which the door 16b is rotated until it contacts physical stops at both extremes of the control range X1 so that the control circuit 300b can recognize the position of the door 16b within the control range X1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A current switching pulse servo in combination with a control circuit, the combination comprising:
   a motor configured to drive a gear train of the current switching pulse servo;
   an output gear configured to be driven by the gear train;
   a pulse pattern plate including conductive portions and nonconductive portions, the pulse pattern plate being configured to rotate with the output gear and connected to a pulse signal detecting circuit of the control circuit; and
   a first conductor connecting the motor to the pulse pattern plate in series to conduct current from the motor to the pulse pattern plate; wherein
   two wires connect the pulse pattern plate to the pulse signal detecting circuit; and
   one wire connects the motor to the pulse pattern plate.

2. The combination of claim 1, wherein the motor is a DC motor.

3. The combination of claim 1, further comprising:
an output shaft connected to the output gear; and
a door connected to the output shaft, the output shaft operable to rotate the door within a control range.

4. The combination of claim 1, wherein:
the conductive portions include outer conductive portions and the nonconductive portions include outer nonconductive portions, the outer conductive portions and the outer nonconductive portions are alternately arranged in an outer pulse pattern;
the conductive portions include inner conductive portions and the nonconductive portions include inner nonconductive portions, the inner conductive portions and the inner nonconductive portions are alternately arranged in an inner pulse pattern;
each of the outer conductive portions and the inner conductive portions define first circumference angles, and each of the outer nonconductive portions and the inner nonconductive portions define second circumference angles; and
each of the first circumference angles are twice as large as each of the second circumference angles.

5. The combination of claim 4, wherein the outer pulse pattern is displaced relative to the inner pulse pattern by a distance equal to about half of the first circumference angles.

6. The combination of claim 1, wherein the first conductor is a first wire extending from the motor to a common conductor brush in continuous contact with a common conductive portion of the pulse pattern plate.

7. The combination of claim 1, wherein:
a first brush connector is aligned with an outer pulse pattern of the pulse pattern plate including the conductive portions and the nonconductive portions in alternating arrangement;
a second brush connector is aligned with an inner pulse pattern of the pulse pattern plate including alternately arranged conductive portions and nonconductive portions; and
a third brush connector is aligned with a common conductive portion between an axial center of the pulse pattern plate and the inner pulse pattern.

8. The combination of claim 7, wherein:
a second conductor extends from the first brush to conduct A-phase pulses generated at the first brush to a pulse signal detecting circuit; and
a third conductor extends from the second brush to conduct B-phase pulses generated at the second brush to the pulse signal detecting circuit.

9. A current switching pulse servo in combination with a control circuit, the combination comprising:
a DC motor configured to drive a gear train of the current switching pulse servo;
an output gear configured to be driven by the gear train;
a pulse pattern plate including a first pulse pattern, a second pulse pattern, and a common conductive portion, the pulse pattern plate being configured to rotate with the output gear, and connected to a pulse signal detecting circuit of the control circuit;
a first conductor connecting the DC motor to the common conductive portion to conduct current from a motor driving circuit through the DC motor to the common conductive portion;
a second conductor configured to conduct, as first pulses, the current from the DC motor through the common conductive portion and the first pulse pattern to a pulse signal detection circuit; and
a third conductor configured to conduct, as second pulses, the current from the DC motor through the common conductive portion and the second pulse pattern to the pulse signal detection circuit; wherein
two wires connect the pulse pattern plate to the pulse signal detecting circuit; and
one wire connects the motor to the pulse pattern plate.

10. The combination of claim 9, wherein the first pulse pattern is an outer pulse pattern including a plurality of alternately arranged outer conductive portions and outer nonconductive portions, and the second pulse pattern is an inner pulse pattern including a plurality of alternately arranged inner conductive portions and inner nonconductive portions.

11. The combination of claim 9, wherein the first conductor includes a common conductor brush in continuous contact with the common conductive portion.

12. The combination of claim 11, wherein:
the first pulses are A-phase pulses and the second pulses are B-phase pulses; and
the second conductor includes an A-phase brush mounted at the outer pulse pattern, the A-phase brush is configured to conduct the A-phase pulses when the A-phase brush contacts the outer conductive portions.

13. The combination of claim 12, wherein the third conductor includes a B-phase brush mounted at the inner pulse pattern, the B-phase brush is configured to conduct the B-phase pulses when the B-phase brush contacts the inner conductive portions.

14. The combination of claim 10, wherein the outer pulse pattern and the inner pulse pattern each extend approximately 120° about the pulse pattern plate.

15. The combination of claim 10, wherein:
the both outer pulse pattern and the inner pulse pattern include a first home position at a first end thereof and a second home position at a second end thereof; and
a regular repeating pattern of the outer and inner conductive portions and the outer and inner nonconductive portions between the first home position and the second home position is disrupted at each of the first and second home positions.

16. A current switching pulse servo in combination with a control circuit, the combination comprising:
a DC motor configured to receive current from a motor driving circuit of a control circuit, and drive a gear train of the servo;
an output gear configured to be driven by the gear train;
a pulse pattern plate mounted to the output gear including an outer pulse pattern, a common conductive portion, and an inner pulse pattern between the outer pulse pattern and the common conductive portion, the outer pulse pattern includes a plurality of spaced apart outer conductive portions with outer nonconductive portions there between, and the inner pulse pattern includes a plurality of spaced apart inner conductive portions with inner nonconductive portions therebetween, the pulse pattern plate connected to a pulse signal detecting circuit of the control circuit;
a first conductive contact point mounted at the outer pulse pattern and configured to conduct the current from the DC motor to generate A-phase pulses when the first conductive contact point is in electrical contact with the outer conductive portions, a first conductor line being configured to conduct the A-phase pulses to a signal detecting circuit of the control circuit;
a second conductive contact point mounted at the inner pulse pattern and configured to conduct the current from the DC motor to generate B-phase pulses when the second conductive contact point is in electrical contact with the inner conductive portions, a second conductor line being configured to conduct the B-phase pulses to the pulse signal detecting circuit; and a third conductive contact point in continuous contact with the common conductive portion, a third conductor line conducts current from the DC motor to the third conductive contact point; wherein two wires connect the pulse pattern plate to the pulse signal detecting circuit; and one wire connects the motor to the pulse pattern plate.

17. The combination of claim 16, wherein only three conductor lines extend between the servo and the control circuit.

18. The combination of claim 16, wherein an output shaft is mounted to, and rotated by, the output gear.

19. The combination of claim 18, further comprising an air conditioning unit door mounted to the output shaft.

20. The combination of claim 16, wherein the control circuit is configured for connection to an air conditioner electronic control unit including a microcomputer, a memory, and a constant voltage circuit.

21. The combination of claim 1, wherein
the control circuit is connected through the motor and the first conductor to the pulse pattern plate in series to conduct current from the control circuit through the motor and the first conductor to the pulse pattern plate.

22. The combination of claim 1, wherein
the conductive portions include a common conductive portion, outer conductive portions, and inner conductive portions between the outer conductive portions and the common conductive portion,
the nonconductive portions include outer nonconductive portions and inner nonconductive portions,
the outer pulse pattern includes a plurality of spaced apart outer conductive portions with outer nonconductive portions therebetween,
the inner pulse pattern includes a plurality of spaced apart inner conductive portions with inner nonconductive portions therebetween, and
an outer circumference angle of one of the outer nonconductive portions is successive, with no interval, to an inner circumference angle of subsequent one of the inner nonconductive portions in a circumferential direction.

23. The combination of claim 22, wherein
when at least one of the outer conductive portions conducts current from the motor, an A-phase pulse becomes 1,
when none of the outer conductive portions conducts current from the motor, an A-phase pulse becomes 0,
when at least one of the inner conductive portions conducts current from the motor, an B-phase pulse becomes 1,
when none of the inner conductive portions conducts current from the motor, an B-phase pulse becomes 0, and
at least one of the A-phase pulse and the B-phase pulse is 1 with no interval.

24. A current switching pulse servo in combination with a control circuit comprising:
A motor configured to drive a gear train of the current switching pulse servo;
An output gear configured to be driven by the gear train;
a pulse pattern plate including conductive portions and nonconductive portions, the pulse pattern plate being configured to rotate with the output gear and connected to a pulse signal detecting circuit of the control circuit; and
A first conductor connecting the pulse pattern plate to the motor in series to conduct current from the pulse pattern plate to the motor; wherein two wires connect the pulse pattern plate to the pulse signal detecting circuit; and
one wire connects the motor to the pulse pattern plate.

25. The combination of claim 24, wherein
the control circuit is connected through the first conductor and the pulse pattern plate to the motor in series to conduct current from the control circuit through the first conductor and the pulse pattern plate to the motor.

26. The combination of claim 24, wherein
the conductive portions include a common conductive portion, outer conductive portions, and inner conductive portions between the outer conductive portions and the common conductive portion,
the nonconductive portions include outer nonconductive portions and inner nonconductive portions,
the outer pulse pattern includes a plurality of spaced apart outer conductive portions with outer nonconductive portions therebetween,
the inner pulse pattern includes a plurality of spaced apart inner conductive portions with inner nonconductive portions therebetween, and
an outer circumference angle of one of the outer nonconductive portions is successive, with no interval, to an inner circumference angle of subsequent one of the inner nonconductive portions in a circumferential direction.

27. The combination of claim 26, wherein
when at least one of the outer conductive portions conducts current to the motor, an A-phase pulse becomes 1,
when none of the outer conductive portions conducts current to the motor, an A-phase pulse becomes 0,
when at least one of the inner conductive portions conducts current to the motor, an B-phase pulse becomes 1,
when none of the inner conductive portions conducts current to the motor, an B-phase pulse becomes 0, and
at least one of the A-phase pulse and the B-phase pulse is 1 with no interval.

28. The combination of claim 9, wherein
the pulse pattern plate includes an outer pulse pattern, a common conductive portion, and an inner pulse pattern between the outer pulse pattern and the common conductive portion,
the outer pulse pattern includes a plurality of spaced apart outer conductive portions with outer nonconductive portions therebetween, and the inner pulse pattern includes a plurality of spaced apart inner conductive portions with inner nonconductive portions therebetween, and
an outer circumference angle of one of the outer nonconductive portions is successive, with no interval, to an inner circumference angle of subsequent one of the inner nonconductive portions in a circumferential direction.

29. The combination of claim 28, wherein at least one of the first pulses and the second pulses is 1 with no interval.

30. A current switching pulse servo in combination with a control circuit, the combination comprising:
a DC motor configured to drive a gear train of the current switching pulse servo;
an output gear configured to be driven by the gear train;
a pulse pattern plate including a first pulse pattern, a second pulse pattern, and a common conductive portion, the pulse pattern plate being configured to rotate with the output gear and connected to a pulse signal detecting circuit of the control circuit;
a first conductor connecting a motor driving circuit to the common conductive portion to conduct current from the motor driving circuit to the common conductive portion;
a second conductor configured to conduct, as first pulses, the current from the common conductive portion through the first pulse pattern and the DC motor to a pulse signal detection circuit; and a third conductor configured to conduct, as second pulses, the current from the common conductive portion through the second pulse pattern and the DC motor to the pulse signal detection circuit; wherein two wires connect the pulse pattern plate to the pulse signal detecting circuit; and one wire connects the motor to the pulse pattern plate.

31. The combination of claim 30, wherein the pulse pattern plate includes an outer pulse pattern, a common conductive portion, and an inner pulse pattern between the outer pulse pattern and the common conductive portion, the outer pulse pattern includes a plurality of spaced apart outer conductive portions with outer nonconductive portions therebetween, and the inner pulse pattern includes a plurality of spaced apart inner conductive portions with inner nonconductive portions therebetween, and an outer circumference angle of one of the outer nonconductive portions is successive, with no interval, to an inner circumference angle of subsequent one of the inner nonconductive portions in a circumferential direction.

32. The combination of claim 31, wherein at least one of the first pulses and the second pulses is 1 with no interval.

33. The combination of claim 16, wherein an outer circumference angle of one of the outer nonconductive portions is successive, with no interval, to an inner circumference angle of subsequent one of the inner nonconductive portions in a circumferential direction.

34. The combination of claim 33, wherein at least one of the A-phase pulses and the B-phase pulses is 1 with no interval.

35. A current switching pulse servo in combination with a control circuit, the combination comprising:

a DC motor configured to receive current from a motor driving circuit of a control circuit, and drive a gear train of the servo;

an output gear configured to be driven by the gear train;

a pulse pattern plate mounted to the output gear including an outer pulse pattern, a common conductive portion, and an inner pulse pattern between the outer pulse pattern and the common conductive portion, the outer pulse pattern includes a plurality of spaced apart outer conductive portions with outer nonconductive portions there between, and the inner pulse pattern includes a plurality of spaced apart inner conductive portions with inner nonconductive portions therebetween the pulse pattern plate connected to a pulse signal detecting circuit of the control circuit;

a first conductive contact point mounted at the outer pulse pattern and configured to conduct the current to the DC motor to generate A-phase pulses when the first conductive contact point is in electrical contact with the outer conductive portions, a first conductor line being configured to conduct the A-phase pulses to the DC motor and a signal detecting circuit of the control circuit;

a second conductive contact point mounted at the inner pulse pattern and configured to conduct the current to the DC motor to generate B-phase pulses when the second conductive contact point is in electrical contact with the inner conductive portions, a second conductor line being configured to conduct the B-phase pulses to the DC motor and the pulse signal detecting circuit; and a third conductive contact point in continuous contact with the common conductive portion, a third conductor line conducts current from the DC motor to the third conductive contact point; wherein two wires connect the pulse pattern plate to the pulse signal detecting circuit; and one wire connects the motor to the pulse pattern plate.

36. The combination of claim 35, wherein an outer circumference angle of one of the outer nonconductive portions is successive, with no interval, to an inner circumference angle of subsequent one of the inner nonconductive portions in a circumferential direction.

37. The combination of claim 36, wherein at least one of the A-phase pulses and the B-phase pulses is 1 with no interval.

38. The combination of claim 1, wherein the motor being directly connected to the control circuit through only a single conductor.

* * * * *